June 9, 1925.
C. B. ALLEN
VALVE
Filed March 5, 1924.
1,541,757
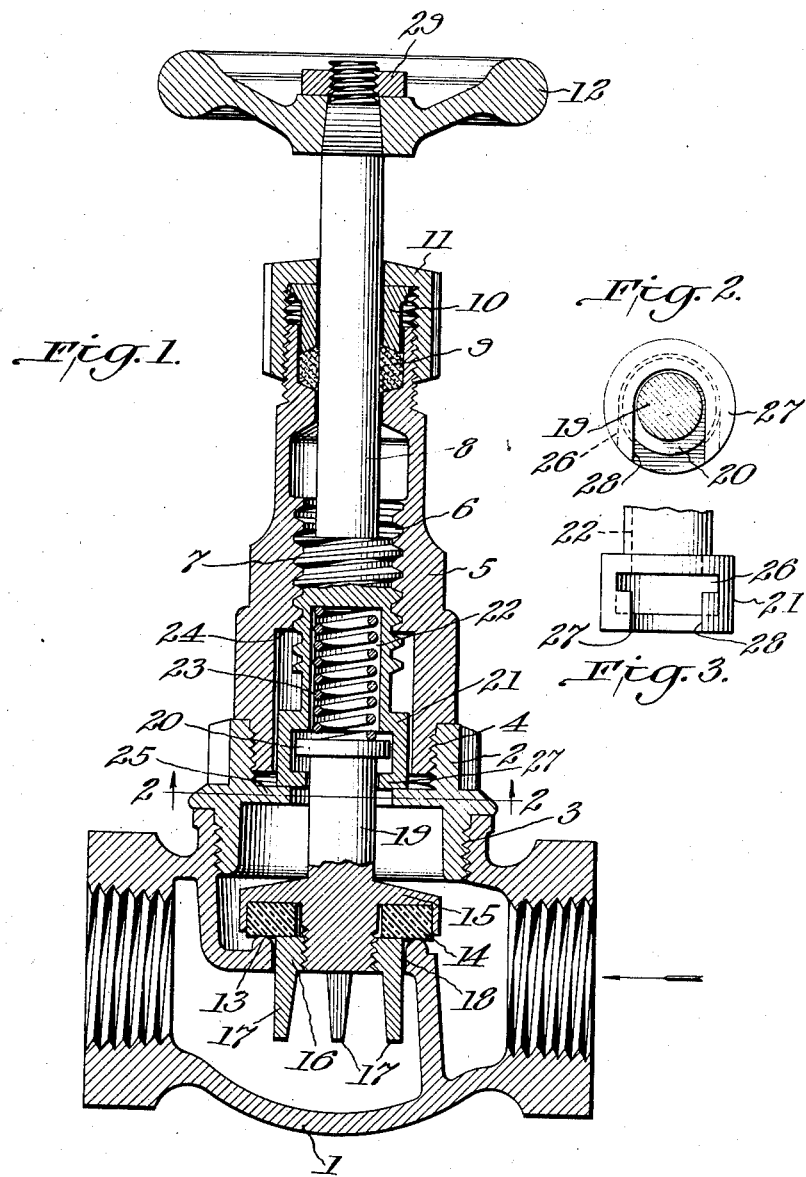

Patented June 9, 1925.

1,541,757

UNITED STATES PATENT OFFICE.

CHARLES B. ALLEN, OF WADSWORTH, OHIO, ASSIGNOR TO THE OHIO INJECTOR COMPANY, OF WADSWORTH, OHIO, A CORPORATION OF OHIO.

VALVE.

Application filed March 5, 1924. Serial No. 697,021.

*To all whom it may concern:*

Be it known that I, CHARLES B. ALLEN, a citizen of the United States, residing at Wadsworth, in the county of Medina and State of Ohio, have invented a certain new and useful Improvement in Valves, of which the following is a full, clear, and exact description.

The object of this invention is to provide a valve for installation in any variety of pressure line, and having a disk so constructed and arranged as to seat always and under all conditions under the pressure of the fluid in the line, irrespective of the manual or other actuation of the valve spindle; whereby application of an excessive pressure upon the disk and seat by manipulation of the valve spindle injurious either to the disk or seat is made impossible.

The invention consists in a valve comprising a body provided with a seat, a disk arranged for cooperation with said seat, and a valve spindle having a loose or lost motion connection with the disk, whereby the disk may be moved toward and withdrawn from seating position, but incapable of applying direct or positive seating pressure to the disk, as I will proceed now to explain and finally claim.

In the accompanying drawing illustrating the invention, in the several figures of which like parts are similarly designated, Figure 1 is a longitudinal central vertical section of a valve embodying my invention, parts thereof being shown in partial elevation. Fig. 2 is a section of the stem of the disk holder and the housing end of the valve spindle cooperating therewith, taken in the plane of line 2—2, Fig. 1. Fig. 3 is a fragmentary side elevation of the housing end of the spindle.

The valve comprises a body 1, having a hub 2 which is connected with the body by a suitable threaded connection 3, and into this hub is threaded at 4 a suitable gland hub or bonnet 5 provided with a screwthread 6 with which engages the screwthread 7 of the valve spindle 8. This spindle 8 extends through a suitable gland, which may comprise a packing 9, gland 10 and gland nut 11, and carries at its upper end any approved form of operating device, such as a wheel 12.

The body 1 is provided with a seat 13, of any approved form, with which cooperates a disk 14 of any desired material, such as any of the well known valve disk compositions, or fiber, this disk being carried in a disk holder 15 and secured therein by a nut 16 having the usual fingers 17 extending through the seat opening 18 and serving as guides to properly center the disk 14 upon its seat 13.

The disk holder 15 has a stem 19 provided with a head 20 fitting loosely within a housing 21 formed on the end of the spindle and permitting a limited axial movement of the disk 14 and its holder 15 with respect to the spindle 8. Above the housing 21 the spindle is formed with a longitudinal bore 22 in which I prefer to mount a compression spring 23 acting against the head 20 of the stem of the disk holder 15, but, if desired, this spring may be omitted without interfering with the efficient operation of the valve, as will hereinafter appear.

The axial movement of the spindle 8 is limited by a shoulder 24 in the gland hub or bonnet 5 and a shoulder or stop 25 in the hub 2.

The valve is assembled as follows:—First, the hub 2 is slipped over the stem 19 of the disk holder 15; then the spring 23 is inserted in the bore 22, and the head 20 of the stem 19 inserted in the housing 21 through an opening 26 therein (see Figs. 2 and 3), the spring 23 being compressed within the bore 22 at this time and being allowed to expand after the insertion of the head 20 to form the connection between the disk holder and the spindle, the bottom 27 of the housing being cut away as at 28 in line with the opening 26 to admit the stem 19. Then the spindle by means of its thread 7 is screwed into the thread 6 of the gland hub or bonnet 5, and the packing 9, gland 10 and gland nut 11 applied. The completion of the assembly of the valve is made by threading the hub 2 into body 1, it being understood that the disk 14 has been previously assembled in the holder 15 by means of the nut 16. The wheel 12 may be applied at any time after the spindle is passed through the gland hub, or may be applied only when it is desired to open or close the valve, a spindle nut 29 being used for holding the wheel in position upon the spindle, in the customary manner.

The operation of the valve is as follows:—
The valve should be inserted in the line in such position that the flow will be in the direction of the arrow, Fig. 1, whereby the pressure of the fluid passing through the valve will tend to force the disk to its seat when the disk is moved to seating position. Assuming that the valve is closed, as shown in Fig. 1, and it is desired to open it, the wheel 12 is turned in contra-clockwise or left-hand direction, thereby, through the cooperation of the screwthreads 6 and 7, raising the spindle and with it the housing 21. During this raising of the spindle and housing, the spring 23 will expand and the disk 14 being under line pressure will remain upon its seat until such time as the bottom 27 of the housing 21 engages with the under face of the head 20, whereupon continued turning of the spindle will cause the disk to be raised from its seat, and this raising may be continued until the top of the housing engages with the shoulder 24 at which time the valve will be completely opened, the fingers 17 meanwhile maintaining the disk 14 and its holder 15 in proper alignment with the seat opening 18 in the usual manner.

To close the valve, the spindle is turned in clockwise or right-hand direction, whereby the above described movements of the parts will be reversed, as follows:—The spindle and its housing will be lowered, and will lower the disk holder 15 and disk 14 to seating position under the influence of the spring 23, the pressure of the fluid entering the valve in the direction of the arrow thereafter serving to hold the disk 14 upon its seat 13 and prevent flow through the valve. Continued turning of the spindle will bring the lower face of the bottom 27 of the housing 21 into engagement with the shoulder 25, thereby limiting the descent of the spindle and preventing its further rotation. It will be seen that, although the valve is completely closed, it is impossible to exert any direct pressure upon the disk 14 by means of the spindle 8, the closing action being obtained solely by means of the spring 23 and the influence of the pressure of the fluid entering the valve. Although this is the case the disk is, nevertheless, positively withdrawn from and advanced toward its seat by the action of the spindle, as above described.

I have hereinbefore stated that the spring 23 may be dispensed with if desired, and pressure of the fluid entering the valve alone relied upon to cause the disk to seat when moved to seating position and to maintain the disk upon its seat. In this case the valve will be opened by the above described cooperation of the bottom 27 of the housing 21 with the head 20, and in closing the valve, the disk 14 will be moved into such proximity to its seat 13 as to permit the pressure of the fluid passing through the valve to exert a closing action upon the disk, by cooperation of the upper inner surface of the housing 21 with the head 20 of the stem 19.

It will thus be seen that I provide a valve which is proof against injury to its disk and seat by the application of unwarranted pressure through the spindle, as is often the case where unskilled workmen manipulate valves in pressure lines, and therefore the life of the valve is greatly increased without sacrificing its efficiency.

Moreover, the valve as hereinbefore pointed out, being so constructed as to operate efficiently whether the spring 23 is used or not, it will be apparent that if for any reason the spring should become broken or should lose its temper and consequently cease to perform its function, the valve will continue to operate efficiently, notwithstanding.

I am aware that valves of the self-seating type have heretofore been provided, but in all of those with which I am familiar, a spring is used for moving the valve disk toward its seat, the seat being provided upon the under face of the partition web of the valve body, and the spring being inserted through an opening in the bottom of the body, which opening is closed by a suitable plug which forms an abutment for one end of the spring, the other end thereof bearing against the under face of the disk holder. In this type of valve, the spindle passes through the seat opening and contacts with the upper end of the disk holder.

Various advantageous modifications in a valve constructed according to my invention will be apparent as compared with valves of this last described type, among which are the following:—The valve opening or area is increased for the reason that the spindle does not extend through the opening. The spring of my valve exerts maximum pressure when the valve is fully closed, whereas the springs of valves of the other type exert minimum pressure upon complete closure of the valve. Valves constructed in accordance with my invention may be made in globe, angle, cross or Y type, whereas valves constructed according to the other design are effective only when made in globe type. Valves constructed in accordance with my invention will operate efficiently if the spring is broken, loses its temper or is omitted altogether, whereas in the other type the spring is essential for moving the disk to within seating position, and if the spring becomes broken, the disk will not seat, even by gravity should the valve be installed in inverted position, if it becomes stuck due to corrosion, scale or other influence, whereas in my valve the disk is positively moved toward its seat even when the spring is broken or omitted by cooperation between the parts 21 and 20.

In my construction, the spring, being housed and out of the direct path of the flow of the fluid passing through the valve, is not subject to the direct action of such fluid, whereas in the case of valves of the other type with which I am familiar, the spring is arranged directly in the path of flow of such fluid, and if this fluid be steam, hot water or other fluid having properties injurious to the temper of the spring, the spring is apt to lose its efficiency.

Moreover, in valves of my design only the three usual openings in the body are necessary, whereas in the other type of valves, a fourth opening is provided for the insertion of the spring, and the valve body thereby relatively weakened.

It will thus be seen that I provide a valve well adapted to the purpose for which it is designed, and embodying marked features of advantage over other valves of this general type with which I am familiar, and although I have hereinabove described and have shown in the drawing a particular embodiment of my invention and a particular formation and arrangement of the parts comprising same, it is to be understood that I do not consider the invention as limited to this particular disclosure, but contemplate various changes in the construction and arrangement of the parts as within the spirit of the invention and the scope of the following claims.

What I claim is:—

1. In a valve, a bonnet, a body provided with a seat, a disk arranged for cooperation with said seat and adapted to be seated thereon by the influence of fluid pressure in said valve and having a headed stem, a spindle having screwthreaded engagement with said bonnet and having an integral housing enclosing the head of said stem and providing a lost motion connection therewith, a hub interposed between and connecting said body and bonnet, and a stop formed in said hub for limiting the valve closing movement of said spindle, said spindle capable of imparting positive unseating movement to said disk but capable only of imparting seating movement thereon to an extent sufficient to permit it to seat under the influence of said pressure.

2. In a valve, a bonnet, a body provided with a seat, a disk arranged for cooperation with said seat and adapted to be seated thereon by the influence of fluid pressure in said valve and having a headed stem, a spindle having screwthreaded engagement with said bonnet and having an integral housing enclosing the head of said stem and providing a lost motion connection therewith, a hub interposed between and connecting said body and bonnet, a stop formed in said hub for limiting the valve closing movement of said spindle, said spindle capable of imparting positive unseating movement to said disk but capable only of imparting seating movement thereto to an extent sufficient to permit it to seat under the influence of said pressure, and a resilient member interposed between the spindle and the head of the stem for assisting fluid pressure in seating the disk.

In testimony whereof I have hereunto set my hand this 3rd day of March, A. D. 1924.

CHARLES B. ALLEN.

Witnesses:
J. A. CRUMWINE,
DON YOUNG.